United States Patent
Skull

(10) Patent No.: US 7,490,190 B2
(45) Date of Patent: Feb. 10, 2009

(54) METHOD AND SYSTEM FOR LOCAL MEMORY ADDRESSING IN SINGLE INSTRUCTION, MULTIPLE DATA COMPUTER SYSTEM

(75) Inventor: Jon Skull, Surrey (GB)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/544,361

(22) Filed: Oct. 5, 2006

(65) Prior Publication Data

US 2007/0055811 A1    Mar. 8, 2007

Related U.S. Application Data

(63) Continuation of application No. 10/171,049, filed on Jun. 12, 2002, now Pat. No. 7,133,999.

(30) Foreign Application Priority Data

Apr. 9, 2002    (GB) ................................ 0208148.7

(51) Int. Cl.
*G06F 12/06*    (2006.01)
*G06F 15/00*    (2006.01)

(52) U.S. Cl. ........................... 711/5; 711/202; 711/211; 712/22; 345/571

(58) Field of Classification Search ............ 711/5, 711/202, 211; 712/22; 345/571
See application file for complete search history.

(56) References Cited

U.S. PATENT DOCUMENTS 4,769,696 A * 9/1988 Utsuda et al. ............... 358/527

| | | | |
|---|---|---|---|
| 5,394,553 A | 2/1995 | Lee | 395/800 |
| 5,634,034 A | 5/1997 | Foster | 711/147 |

(Continued)

FOREIGN PATENT DOCUMENTS

EP    0375401 A1    6/1990

(Continued)

OTHER PUBLICATIONS

D.W. Blevins et al., "BLITZEN: A Highly Integrated Massively Parallel Machine," Proceedings of the $2^{nd}$ Symposium on the Frontiers of Massively Parallel Computation, Oct. 1988, pp. 399-406.*

(Continued)

*Primary Examiner*—Hyung S Sough
*Assistant Examiner*—Mardochee Chery
(74) *Attorney, Agent, or Firm*—Dorsey & Whitney, LLP

(57) ABSTRACT

A single instruction, multiple data ("SIMD") computer system includes a central control unit coupled to 256 processing elements ("PEs") and to 32 static random access memory ("SRAM") devices. Each group of eight PEs can access respective groups of eight columns in a respective SRAM device. Each PE includes a local column address register that can be loaded through a data bus of the respective PE. A local column address stored in the local column address register is applied to an AND gate, which selects either the local column address or a column address applied to the AND gate by the central control unit. As a result, the central control unit can globally access the SRAM device, or a specific one of the eight columns that can be accessed by each PE can be selected locally by the PE.

27 Claims, 5 Drawing Sheets

U.S. PATENT DOCUMENTS

| | | | |
|---|---|---|---|
| 5,926,644 A | 7/1999 | Hays | 712/22 |
| 5,943,283 A * | 8/1999 | Wong et al. | 365/230.01 |
| RE37,103 E | 3/2001 | Katsura et al. | 345/545 |
| 6,304,958 B1 | 10/2001 | Kiuchi et al. | 712/229 |
| 6,338,154 B2 | 1/2002 | Kim | 714/743 |

FOREIGN PATENT DOCUMENTS

| | | |
|---|---|---|
| EP | 0544127 A2 | 6/1993 |
| EP | 0831493 A1 | 3/1998 |

OTHER PUBLICATIONS

Blevins, D. W. et al., "*BLITZEN: A Highly Integrated Massively Parallel Machine*", Proceedings of the 2$^{nd}$ Symposium on the Frontiers of Massively Parallel Computation, Oct. 1988, pp. 399-406.

* cited by examiner

METHOD AND SYSTEM FOR LOCAL MEMORY ADDRESSING IN SINGLE INSTRUCTION, MULTIPLE DATA COMPUTER SYSTEM

CROSS-REFERENCE TO RELATED APPLICATION

This application is a continuation of U.S. patent application Ser. No. 10/171,049, filed Jun. 2, 2002, now U.S. Pat. No. 7,133,999, which claims priority from UK Application No. 0208148.7 filed Apr. 9, 2002.

TECHNICAL FIELD

The invention relates computer systems having multiple processors and a memory device, and, more particularly, to a method and system for allowing the memory device to be addressed either globally by a control unit or locally by each processor.

BACKGROUND OF THE INVENTION

The complexity of computer systems span the range from relatively simple systems having a single central processing unit ("CPU") to systems having many processors that may operate somewhat independently of each other. One conventional multiple processor computer system is known as a single instruction, multiple data ("SIMD") processor. In a SIMD processing system, multiple processors or processor elements ("PEs") simultaneously perform the same operation on different items of data. As a result, SIMD processing systems are particularly useful for processing graphic images since graphic image processing typically involves performing a large number of identical operations on data that may differ from each other.

The PEs in a SIMD processing system are generally coupled to a Central Control Unit that controls the operation of the PEs. The Central Control Unit generally transfers instructions defining the operations that will be performed by the PEs from a single program memory (not shown) into respective register files. The Central Control Unit also loads into the respective register file for each PE the data items that are to be operated on by the PE. Each PE can access its register file to read data, perform the operation on the data, and write results from the operation to the register file. The Central Control Unit can then read the results of all of the operations performed by the PEs by reading from all of the register files. Thus, the register files can be accessed by either the Central Control Unit or its respective PE.

Although separate register files can be provided for each PE, register files for multiple PEs can alternatively be implemented by a memory device, such as a static random access memory ("SRAM") device or a dynamic random access memory ("DRAM") device, that is shared by the PEs. In particular, a memory device having an array formed by rows and columns can be organized so that each PE receives data from a respective group of columns in the array. The Central Control Unit can write data to and read data from any location in the memory array, and each PE can write data to and read data from its respective group of columns in the memory array.

A typical SIMD processing system 10 is shown in FIG. 1. The processing system 10, which is being commercially developed under the code name "Yukon," includes a central control unit 14 coupled to an address bus 16 and a data bus 18. The address bus 16 and data bus 18 are coupled to 32 SRAM devices $20_1$-$20_{32}$. Each SRAM device 20 includes an array of memory cells (not shown), row and column decoders (not shown) for selecting rows and columns in the array based on respective row and column addresses, a data path (not shown) coupling the data bus 18 to the array, and a variety of other components. In the SRAM devices 20 proposed for use in the Yukon SIMD processing system 10, the array in each SRAM device 20 includes 8 rows of memory cells arranged in 64 columns, and each column can store one byte (8 bits) of data. Thus, each SRAM device 20 includes 4,096 memory cells. In practice, the Central Control Unit 14 includes a PE Control Unit (not shown) providing control and address signals to the SRAM device 20, and a Data Control Unit (not shown) controlling the flow of data to and from the SRAMs 20.

The SIMD processing system 10 also includes 256 PEs designated $PE_1$-$PE_{256}$, eight of which share a respective SRAM device 20. For example, $PE_1$-$PE_8$ share the SRAM device $20_1$. The PEs are coupled to their respective SRAMs 20 by respective data buses $40_1$-$40_{256}$ so that each PE can receive data from memory cells in one of a respective group 8 columns. For example, the $PE_1$ can access data stored in columns 0-7 of the SRAM $20_1$, $PE_8$ can access data stored in columns 56-63 of the SRAM $20_1$, and $PE_{256}$ can access data stored in columns 56-63 of the SRAM $20_{32}$. It will therefore be apparent that the SRAMs 20 are dual ported SRAMs since the Central Control Unit 14 can access the SRAMs 20 through data ports that are different from the data ports each of the PEs accesses the SRAMs 20.

The Central Control Unit 14 also includes a number of control signal lines that are coupled to the SRAMs 20 and the PEs, but these lines have been omitted from FIG. 1 in the interest of brevity and so as not to unduly obscure certain details about the SIMD computer system 10 shown in FIG. 1. In the Yukon system, these control lines control the operation of all of the PEs so all of the PEs perform the same function. However, in other SIMD computer systems, the PEs may access the same or different instructions from a program memory (not shown).

In operation, the Central Control Unit 14 writes data to specific locations in each of the SRAMs 20. Since the computer system 10 is a SIMD system, the PEs generally perform the same function, although the data stored in the SRAMs 20 for each PE often varies. The Central Control Unit 14 applies row addresses to the SRAM's to make available to the PEs the data that are operated on by the PEs. Each PE then produces a respective result, and this result is made available to an SRAM 20. The Central Control Unit 14 addresses the SRAMs 20 to write the result data from each of the PEs to memory cells in at least one of the respective groups of columns that are coupled to the PE. Finally, the Central Control Unit 14 reads the results data from the SRAMs 20. Thus, the SRAM provide both scratch pad storage for the PEs and a communications path between the PEs and the Central Control Unit 14.

Although the SIMD system 10 shown in FIG. 1 can significantly increase the speed at which certain repetitious operations can be performed, it requires almost complete parallelism of the operations performed by the PEs. In particular, although different data can be stored in the SRAMs 20, all of the PEs must receive data from the same locations in the SRAMs 20. Similarly, results data from all of the PEs must be stored in the same row location and same column location within a respective group of columns. A PE cannot receive data from or transfer data to different locations in the SRAMs depending upon the results of an operation performed by the PE. These limitations on the PEs' ability to access different locations in the SRAM 20 depending upon the results of an operation can seriously limit the usefulness and versatility of SIMD computer systems like the system 10 shown in FIG. 1.

There is therefore a need for a SIMD computer system that allows individual PEs to access data and instructions from different locations in a register file or memory device depending upon the results of operations performed by the PEs.

SUMMARY OF THE INVENTION

A single instruction, multiple data computer system includes a central control unit having an address bus. The central control unit includes an address bus to which global column information corresponding to a respective global column address is applied. Also included in the system is at least one memory device having a column selection port and an array of memory locations arranged in rows and columns. A plurality of processing elements are each coupled to memory cells in a respective group of columns of the array. A plurality of local column registers each have an input port coupled to a data bus of a respective processing element to receive and store local column information corresponding to a local column address. The local column information from each local column register is applied to a respective selection device that also receives the global column information from the central control unit. The selection device is operable to couple the global column information to the column selection port of the memory device in a global addressing mode, and is operable to couple the local column information to the column selection port of the memory device in a local addressing mode.

DETAILED DESCRIPTION OF THE INVENTION

Figure 2:
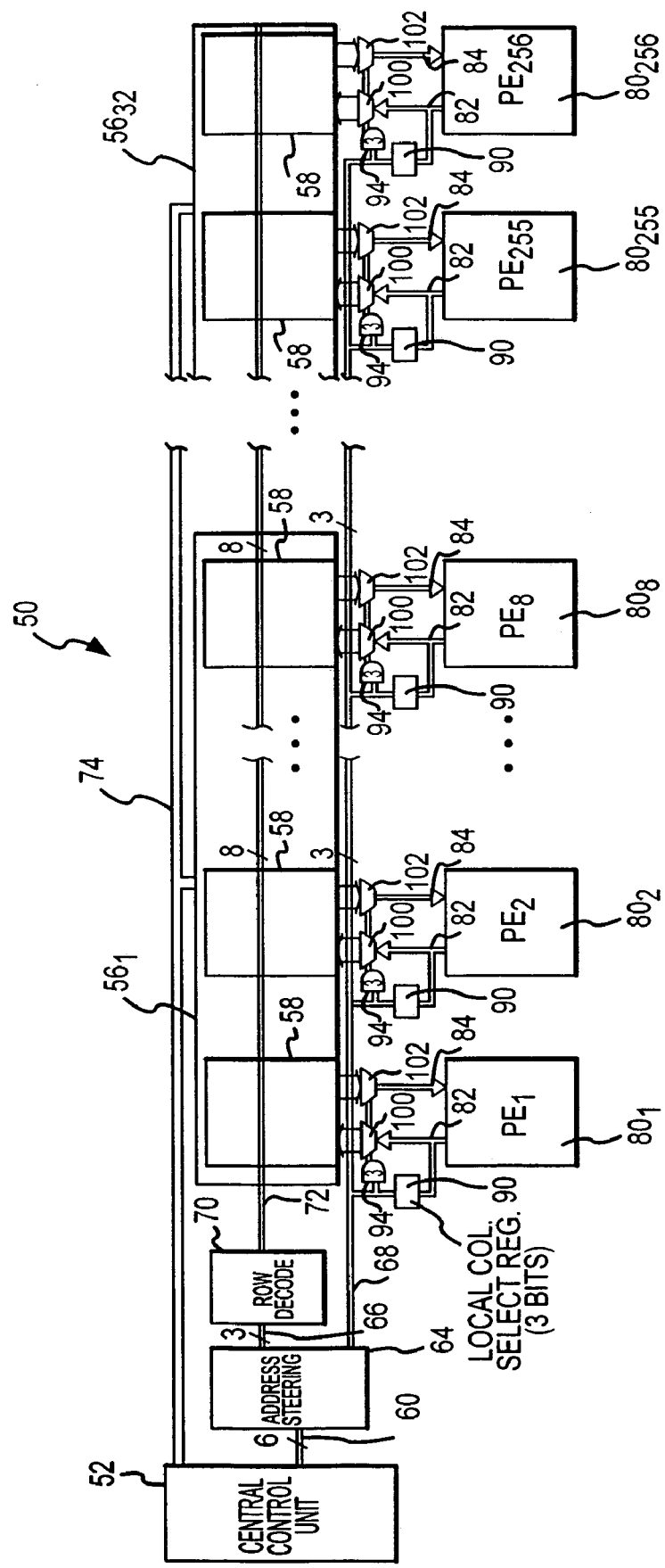
FIG. 2 is a block diagram of a SIMD computer system according to one embodiment of the invention.

A SIMD computer system 50 according to one embodiment of the invention is shown in FIG. 2. The computer system 50 includes a Central Control Unit 52, which may be a conventional central processing unit ("CPU") or microprocessor. The Central Control Unit 52 includes a data bus coupled to a data port of 32 SRAMs $56_1$-$56_{32}$. Each of the SRAMs 56 includes 8 SRAM arrays 58, each of which has 8 rows and 8 columns. Each column has 8 memory locations and can therefore store 8 bits. The Central Control Unit 52 also includes a 6-bit address bus 60 coupled to an address steering unit 64. The address steering unit selects certain bits of the 6-bit address to create a row address applied to a row address bus 66, and the remaining bits of the 6-bit address are used to create a column address that is applied to a column address bus 68. The row address bus 66 is coupled to a row decoder 70 that provides row select signals on a row select bus 72. As is well known in the art, the row select signals activate respective rows in the SRAMs 56 corresponding to the row address applied to the row decoder 70 by the address steering unit 64. The Central Control Unit 52 also includes a data bus 74 that is coupled to a respective data port of each SRAM 56.

The Central Control Unit 52 also includes a number of signal lines (not shown) that are coupled to the SRAMs 62, but these have been omitted from FIG. 2 in the interest of clarity and brevity.

As explained in greater detail below, the address steering unit 64 selects bits from the 6-bit address for a row address and a column address to load data and instructions into, and read data from, the SRAMs 56 in a several different formats. For example, by properly selecting bits to create a row address and a column address, 32-bit data word can be loaded into memory cells in the SRAM 56 in a single column spanning 4 rows.

With further reference to FIG. 2, the computer system 50 includes 256 processing elements ("PEs") $80_1$-$80_{256}$. Groups of 8 PEs $80_1$-$80_8$ ... $80_{249}$-$80_{256}$ are coupled through respective write data buses 82 and read data buses 84 to respective SRAMs $56_1$ ... $56_{32}$. For example, the PEs $80_1$-$80_8$ are coupled to the SRAM $56_1$, as shown in FIG. 2. Each PE 80 is coupled to a respective one of the memory cell arrays 58. As mentioned above, each array 58 includes memory cells arranged in 8 rows and 8 columns, each of which stores 8 bits. Thus, since 8 arrays 58 are included in each SRAM 56, each SRAM 56 stores 4096 bits of data, and each PE 80 can access 512 bits of data in its respective 8 columns of its array 58.

Figure 1:
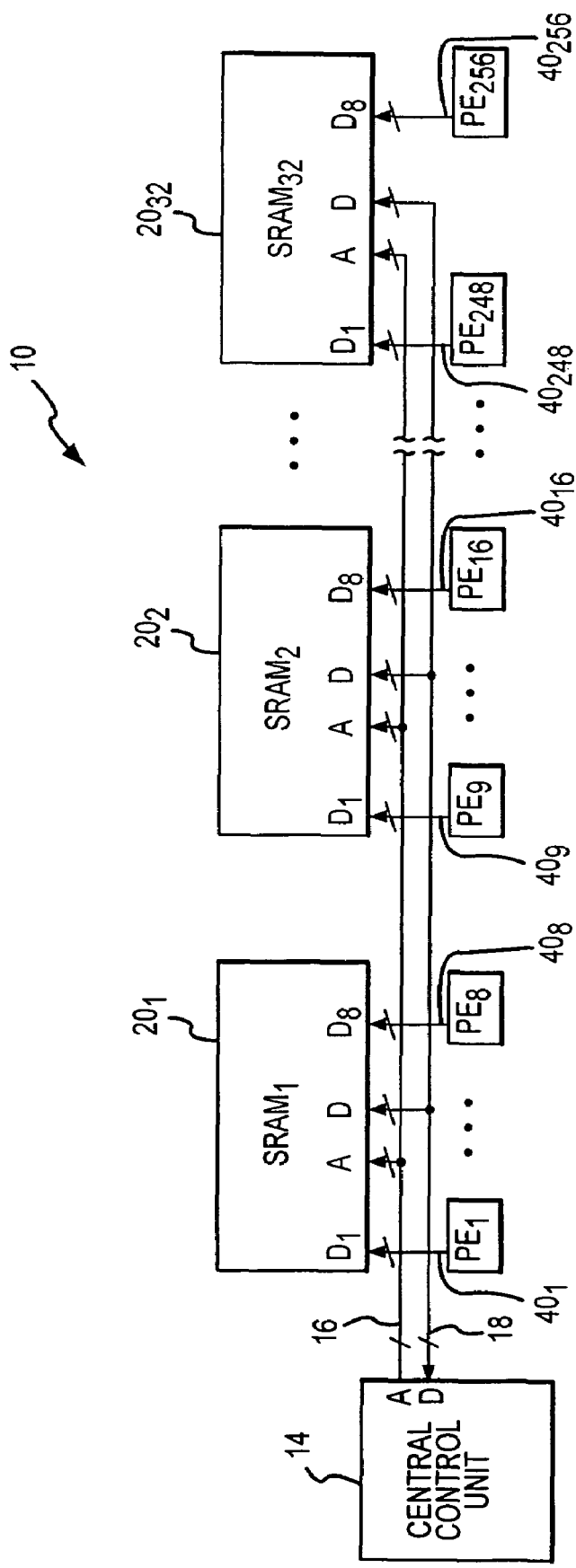
FIG. 1 is a block diagram of a conventional SIMD computer system.

Unlike the conventional SIMD computer system 10 shown in FIG. 1, the PEs 80 in the SIMD computer system 50 of FIG. 2 can locally provide column addresses to its respective array 58, although row addresses are provided globally by the Central Control Unit 52. More specifically, the write data bus 82 of each PE $80_1$-$80_{256}$ is coupled to a respective local column address register $90_1$-$90_{256}$ that stores a 3-bit local column address provided by its respective PE $80_1$-$80_{256}$. Each local column address register $90_1$-$90_{256}$ provides its 3-bit column address to one input of an AND gate 94 provided for each bit of the column address. A second input of the AND gate 94 provided for each bit is coupled to the column address bus 68. The outputs of the AND gates 94 are coupled to control inputs of a write data multiplexer 100 and a read data multiplexer 102. The multiplexers 100, 102 decode the received column address and then couple a corresponding one of 8 columns of memory cells (i.e., a set of 8 digit lines) in its respective array 58 to the write data bus 82 and read data bus 84 of its respective PE 80. The specific column of memory cells coupled to the write data bus 82 and read data bus 84 is selected by the column address at the output of the AND gates 94. As explained below, the AND gates 94 either couple the global column address bus 68 to the multiplexers 100, 102 to allow the Central Control Unit to provide column addresses to the SRAMs 56 or couple each write data bus 82 to the multiplexers 100, 102 to allow the PEs 80 to provide column addresses to the SRAMs 56. As a result, each PE 80 can locally address its array 58, which serves as the register file for the PE 80. Significantly, each column address register is programmed by its respective PE 80. As a result, local addressing is provided in a manner that does not require time-consuming loading of addresses into local addresses registers from a single device, such as the Central Control Unit 52. Also, it is relatively easy to implement the embodiment of FIG. 2 because the PEs local address is passed through the PEs data port. The other circuitry associated with each PE is also naturally physically close to this data port. No long global connections are required in the SRAM, and no extra ports for the PEs address.

Whether the AND gates 94 provide either global or local addressing of the SRAM columns is determined by the logic levels applied to the AND gates 94. When the SRAMs 56 are to be addressed globally, the PE's 80 load three high logic levels into their respective local column address registers 90 so that the registers 90 provide high logic levels to the AND gates 94. The logic level at the outputs of the AND gates 94 is then controlled by the logic levels applied to the AND gates 94 by the address steering unit 64. For example, if the address steering unit 64 outputs a high logic level to one of the AND gates 94, the AND gate 94 will output a high logic level.

When the SRAMs 56 are to be addressed locally, the address steering unit 64 applies high logic levels to the AND gates 94 so that the logic levels at the outputs of the AND gates 94 are controlled by the logic levels provided by each local column address register 90. The PE's 80 each provide a local column address by outputting three column address bits on its write data bus 82, which are loaded into the column address register 90. The column address register 90 then applies the local column address to the AND gates 94, which outputs that address to the multiplexers 100, 102. The multiplexers 100, 102 then decode the received column address and select a corresponding column of memory cells in its respective array 58. Each PE 80 can therefore locally select each of 8 different columns of the SRAM 56 to write or read data.

Although the PEs 80 can locally address the SRAM 56, the PEs can only address columns of the SRAM 56. They cannot provide row addresses to the SRAM 56. Instead, for both global addressing and local addressing, the row select signals are provided by the row decoder 70. As previously mentioned, these row select signals are provided by responsive to row addresses generated by the Central Control Unit 52 through the address steering unit 64. It is therefore important for the Central Control Unit 52 to stores data in the SRAM 64 in a manner that can be easily accessed by the PEs 80. Although each PE has only 8-bit data buses 82, 84, the PE can operate on data words of 8, 16, 32, or 64 bits. A 16-bit word is formed by two 8-bit words, a 32-bit word is formed by four 8-bit words, and a 64-bit word is formed by eight 8-bit words. As explained below, the format in which the data are stored in the SRAM 64 should vary depending upon the number of bits in each word that will be accessed by the PEs 80. This storage format, known as the "granularity," is accomplished according to the following Table 1, which will be explained with reference to the embodiment of the address steering unit shown in FIG. 3.

TABLE 1

| Local Granularity | Word Size (bits) | Row Addr. Bits | Col. Addr. Bits |
|---|---|---|---|
| 1 | 8 | 5, 4, 3 | 2, 1, 0 |
| 2 | 16 | 5, 4, 0 | 3, 2, 1 |
| 4 | 32 | 5, 1, 0 | 4, 3, 2 |
| 8 | 64 | 2, 1, 0 | 5, 4, 3 |

Figure 3:
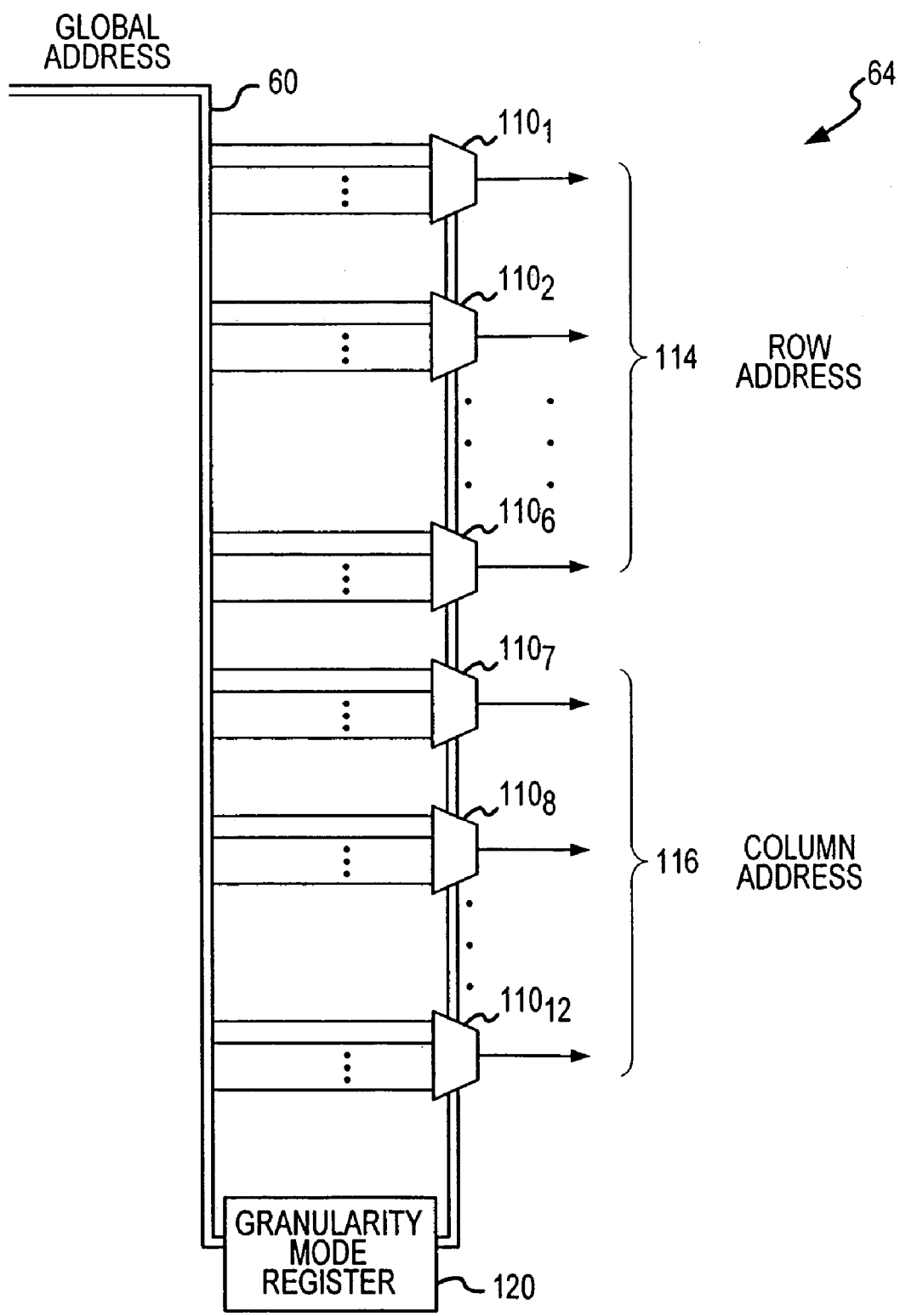
FIG. 3 is a block diagram and schematic of an address steering unit that is used in the SIMD computer system of FIG. 2.

With reference to FIG. 3, one embodiment of the address steering unit 64 includes a plurality of multiplexers 110₁-110₁₂ each of which receives the 6 address bits from the Central Control Unit 52 through the address bus 60. The multiplexers 110 are divided into two groups, a set of row address multiplexers 114 and a set of column address multiplexers 116. The row address multiplexers 114 select bits from the address bus for use as row addresses, which are applied to the row address bus 66, and the column address multiplexers 116 select bits from the address bus for use as column addresses, which are applied to the column address bus 68. It can be seen from Table 1 that any of address bits 0-5 can be selected for use as either a row address or a column address. Therefore, 12 multiplexers 110₁-110₁₂ are provided, 6 of which are row address multiplexers 114 and 6 of which are column address multiplexers 116.

With further reference to FIG. 3, the operation of the multiplexers 110 is controlled by a granularity mode register 120 that is programmed to a specific granularity mode by the 6 bit address on the address bus 60 when the register 120 is placed into a programming mode by suitable means. The granularity mode register 120 uses conventional logic gates to implement the address steering functions shown in Table 1. More specifically, when the granularity mode register 120 is programmed to a local granularity of 1, the row address multiplexers 114 select bits 5,4,3 from the address bus 60 for use as row addresses, and the column address multiplexers 116 select bits 2,1,0 from the address bus 60 for use as column addresses. When the granularity mode register 120 is programmed to a local granularity of 2, the row address multiplexers 114 select bits 5,4,0 for use as row addresses, and the column address multiplexers 116 select bits 3,2,1 for use as column addresses. Similarly, when the granularity mode register 120 is programmed to a local granularity of 4, the row address multiplexers 114 select bits 5,1,0 from the address bus 60 for use as row addresses, and the column address multiplexers 116 select bits 4,3,2 from the address bus 60 for use as column addresses. Finally, when the granularity mode register 120 is programmed to a local granularity of 8, the row address multiplexers 114 select bits 2,1,0 for use as row addresses, and the column address multiplexers 116 select bits 5,4,3 for use as column addresses.

The effect of steering the 6 address bits on the address bus 60 as described above will now be explained with references to FIGS. 4A and B, which shows two different arrangements in which sequentially ordered addresses are selected by the row addresses and column addresses for different granularities. The sequentially ordered addresses are shown schematically in FIGS. 4A and 4B from the lowest order address "000000" at the top to the highest order addresses "111111" at the bottom.

Figure 4A:
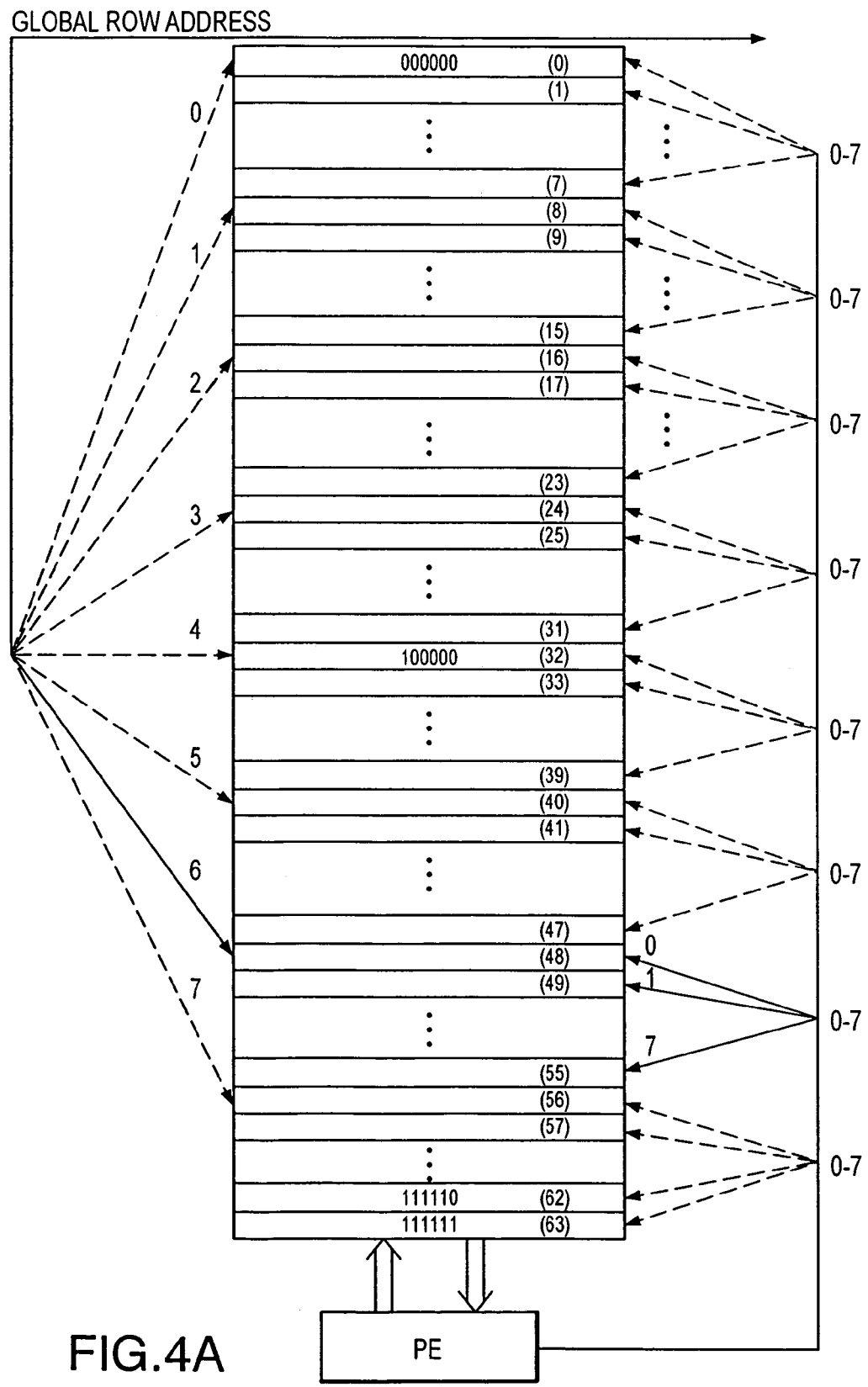
FIGS. 4A and 4b are schematic diagrams showing two different modes in which data can be stored and accessed in the SIMD computer system of FIG. 2.

As shown if FIG. 4A, selecting bits 5,4,3 for use as a row address and bits 2,1,0 for use as a column address provides a granularity of 1, allows the row address to activate rows of memory that are eight memory addresses apart from each other. The column address then selects a column to read an 8-bit word from or write an 8-bit word to in the active row. As a result, when the Central Control Unit 52 writes an 8-bit word (i.e., 1 byte of data) into the memory cell array 58 (FIG. 2) for one of the PEs 80, the data will be stored in a single column of the array 58 within a single row. When the PE 80 accesses the 8-bit word, the Central Control Unit 52 will, of course, control when the word is available to the PE 80 by activating the row in which it is stored. But the PE 80, by generating a local column address, can determine from which column the byte is accessed. Thus, although all of the PEs 80 are operating together as a SIMD computer system, each PE can write data to and read data from different locations in the SRAM 56 depending, for example, on the results of an operation by each PE 80.

Figure 4B:
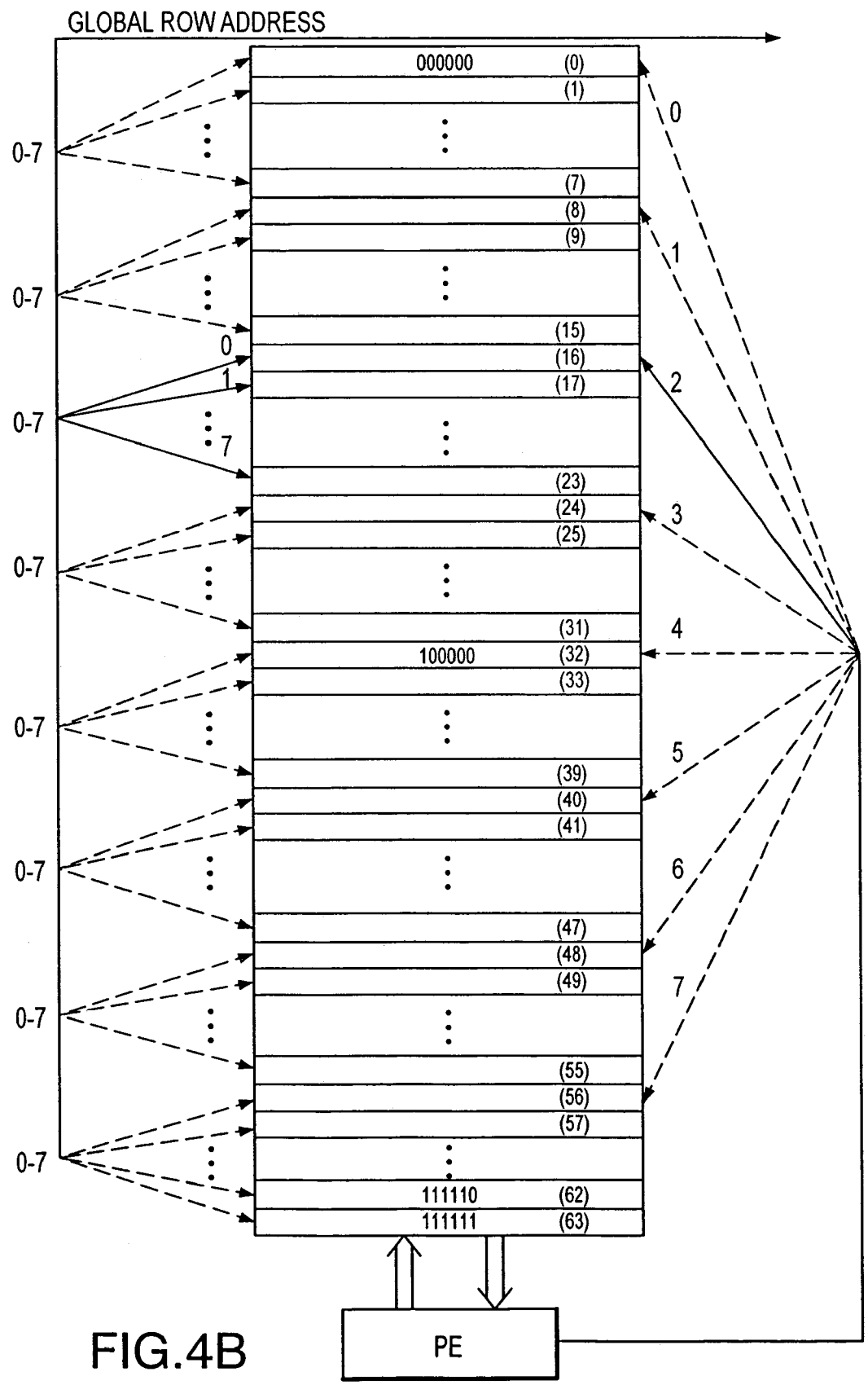

As shown in FIG. 4B, with a granularity of 8, bits 2,1,0 are selected for use as row addresses and bits 5,4,3 are selected for use as column addresses. As a result, the column address can select memory addresses that are 8 memory addresses apart from each other. The row address then activates one row within each group of eight memory addresses selected by the column address. As a result, a 64-bit word (i.e., 8 bytes of data) will be stored in a single column of the array 58 spanning eight rows. The PE 80, by generating a local column address, can again determine from which column the eight bytes are accessed.

Although not shown in the Figures, bits 5,4,0 can be selected for use as a row address and bits 3,2,1 can be selected for use as a column address to provide a granularity of 2, as shown in Table 1. A granularity of 2 allows the column address to select columns of memory that are two memory addresses apart from each other. The row address then activates one row within each group of two memory addresses selected by the column address. As a result, when the Central Control Unit 52 writes a 16-bit word (i.e., 2 bytes of data) into the memory cell array 58 for one of the PEs 80, the data will be stored in a single column of the array 58 spanning two rows. When the PE 80 accesses the 16-bit word, the Central Control Unit 52 will control when each byte of the 16-bit word is available to the PE 80. But the PE 80, by generating a local column address, can determine from which column the 2 bytes are accessed.

Finally, selecting bits 5,1,0 for use as a row address and bits 4,3,2 for use as a column address provides a granularity of 4, as also indicated in Table 1. A granularity of 4 allows the column address to select four columns of memory that are four memory addresses apart from each other. The row address then activates one row within each group of four memory addresses selected by the column address. As a result, when the Central Control Unit 52 writes a 32-bit word (i.e., 4 bytes of data) into the memory cell array 58, the data will be stored in a single column of the array 58 spanning four rows. When the PE 80 accesses the 32-bit word, the Central Control Unit 52 will again control when each byte of the 4-byte word is available, but the PE 80, by generating a local column address, can determine from which column each byte is accessed.

The SIMD computer system 50 shown in FIG. 2 thus provides local addressing in a manner that provides a great deal of flexibility. Furthermore, each PE can generate its own local address, thereby avoiding time-consuming loading of local address registers from a single device.

From the foregoing it will be appreciated that, although specific embodiments of the invention have been described herein for purposes of illustration, various modifications may be made without deviating from the spirit and scope of the invention. For example, although each local column address register 90 stores a column address that is decoded by the multiplexers 100, 102, it will be understood that the multiplexers 100, 102 could alternatively receive column select signals that would select a specific column without the need to decode a column address. In such case, the Central Control Unit 52 and the PEs 80 would generate the column select signals from a column address, and a local column select register (not shown) would be used to store local column select signals instead of using the local column address register 90 to store local column addresses. Also, although the SIMD computer system shown in FIG. 2 uses 256 PEs, eight of which share each SRAM and each of which can access a respective group of 8 columns, it will be understood that SIMD computer systems in accordance with the invention may have other architectures. For example, a greater or lesser number of PEs may be included in the system, and each memory device, which may be a SRAM or some other memory device, may be accessed by a greater or lesser number of PEs. As another example, each PE may access a respective group having a greater or lesser number of columns. Other modifications will be apparent to one skilled in the art. Accordingly, the invention is not limited except as by the appended claims.

The invention claimed is:

1. A single instruction, multiple data computer system ("SIMD") including at least one memory device having a plurality of memory arrays, each of the arrays having memory cells arranged in rows and columns, the SIMD system comprising:
   a central control unit having an address bus, the central control unit applying an address signal to the address bus;
   an address steering circuit having a row address bus and a column address bus, and configured to receive the addressing signal from the central control unit, the address steering circuit operable to generate in response to the addressing signal a control signal indicative of the number of bits in the word to be accessed, the control signal having a granularity mode corresponding to a storage format for selecting a column of the memory cells for accessing a word having a predetermined number of bits, and further operable to generate a row address to apply to the row address bus and a column address to apply to the column address bus in response to the control signal;
   a plurality of processing elements each having a data bus and an address bus coupled to a respective memory array of the at least one memory device, each processing element operable to generate and provide a local column address to apply to the respective address bus, the local column address being generated without the assistance of the address steering circuit; and
   a plurality of select circuits each coupled to a respective data bus coupled to a memory array of the at least one memory device, each of the select circuits configured to receive the column address from the column address bus of the address steering circuit and the localized column address from the data bus of a respective processing element, each of the select circuits operable to select either the column address or the local column address to access a column of memory cells from the respective memory array.

2. The SIMD system of claim 1 further comprising a plurality of local column registers each having an input port coupled to the data bus of a respective processing element to receive and store the local column address, and each having an output port coupled to provide the local column address to a respective select circuit.

3. The SIMD system of claim 1 wherein the select circuit comprises a logic gate to select either the column address or the local column address.

4. The SIMD system of claim 3 wherein the data bus of each of the processing elements comprises:
   a write data bus coupling write data from the processing element to the respective select circuit; and
   a read data bus coupling read data from the respective select circuit to the processing element.

5. The SIMID system of claim 1 wherein the addressing signal applied by the central control unit comprises global addressing information.

6. The SIMD system of claim 1 wherein the addressing signal applied by the central control unit comprises 6 address bits, and wherein the address steering circuit comprises being operable to generate the row address from 3 of the 6 bits and the column address from the remaining 3 of the 6 bits.

7. The SIMD system of claim 6 wherein the address steering circuit comprises being operable to generate 3-bit column addresses responsive to either 8, 16, 32, or 64 bits.

8. A control subsystem for addressing at least one memory device in a single instruction, multiple data computer system, the control subsystem comprising:

a plurality of memory arrays, each having a memory data port and an array of memory cells arranged in rows and columns;

a mode register circuit having an address bus and configured to receive an address signal, the mode register circuit operable to generate a control signal indicative of the number of bits in the word to be accessed responsive to the received address signal, and further operable to generate a row address and a global column address to apply on the address bus in response to the control signal, the control signal indicative of the number of bits in the word to be accessed comprises a granularity mode corresponding to a storage format for selecting a column of the memos cells for accessing a word having a predetermined number of bits;

a plurality of processing elements, each having a data bus and an address bus, each processing element being operable to generate a localized column address to apply to the respective address bus, the localized column address being generated without the use of the global column address; and a plurality of logic circuits, each respectively coupled to the memory data port of each of memory array, and each configured to receive the global column address from the mode register circuit and the localized column address from a respective processing element, each of the plurality of logic circuits operable to either select the global column address in a global addressing mode and the localized column address in a local addressing mode, and to apply the selected address on the memory data port.

9. The control subsystem of claim 8 further comprising a plurality of local column registers each having an input port coupled to the data bus of a respective processing element to receive and store the local column address, and each having an output port coupled to provide the local column address to a respective select circuit.

10. The control subsystem of claim 8 wherein the mode register circuit comprises a plurality of multiplexers, wherein a first group of multiplexers being configured provide the row address in response to receiving the control signal, and a second group of multiplexers being configured to provide the column address in response to receiving the control signal.

11. The control subsystem of claim 10 wherein the first group of multiplexers comprises generating a 3-bit row address and wherein the second group of multiplexers comprises generating a 3-bit column address.

12. The control subsystem of claim 8 wherein the granularity mode comprises selecting 64 bits as the predetermined number bits for a granularity mode having a value 8.

13. The control subsystem of claim 8 wherein the select circuit comprises a logic gate to select the column address in the global addressing mode and the localized column address in the local addressing mode.

14. The control subsystem of claim 13 wherein the data bus of each of the processing elements comprises:
a write data bus coupling write data from the processing element to the respective logic circuit; and
a read data bus coupling read data from the respective logic circuit to the processing element.

15. The control subsystem of claim 14 wherein the select circuit further comprises a first multiplexer coupled to the write data bus and a second multiplexer coupled to the read data bus.

16. A method of addressing a memory device by a plurality of processing elements coupled to a respective plurality of array of memory cells in a single instruction, multiple data computer system, comprising:
receiving an addressing signal and programming an addressing mode responsive to the addressing signal;
generating a global column address based on the received addressing signal;
generating a local column address without using the global column address and storing the local column address;
selecting a column of memory cells using either the global column address or the stored local column address by at least one processing element depending on the programmed addressing mode; and
simultaneously selecting a column of memory cells using the local column address by at least another processing element.

17. The method of claim 16 wherein generating either a global or local column address comprises generating a 3-bit column address.

18. The method of claim 16 wherein receiving the addressing signal comprises receiving a global address signal.

19. The method of claim 16 wherein selecting a column of memory cells using either the global column address or the stored local column address comprises comparing the receive addresses using a logic gate.

20. The method of claim 19 further comprising selecting a column of memory cells to either write data to or read data from the array of memory cells.

21. The method of claim 16 wherein receiving an address signal comprises receiving an address signal from a central control unit.

22. A method of addressing a memory device in a single instruction, multiple data computer system, comprising:
receiving an addressing signal and selecting an addressing mode responsive to the addressing signal;
generating a control signal indicative of a predetermined number of bits in the word to be accessed responsive to the received addressing signal;
generating a row address and a global column address responsive to the control signal;
generating a localized column address without utilizing the global column address;
selecting a group of memory cells having the predetermined word size using the row address and the global column address in a global addressing mode; and
selecting a group of memory cells having the predetermined word size using the row address and the localized column address in a localized addressing mode.

23. The method of claim 22 wherein generating a control signal indicative of a predetermined number of bits in the word to be accessed comprises a granularity value.

24. The method of claim 23 wherein the predetermined number of bits comprises 8, 16, 32, or 64 bits.

25. The method of claim 24 wherein the granularity value comprises a granularity value of 8 selecting a column of memory cells for accessing a word having 64 bits.

26. The method of claim 22 wherein selecting a group of memory cells in the global addressing mode or the localized addressing mode comprises using a logic gate.

27. The method of claim 22 further comprising selecting a group of memory cells to either write data to or read data from the array of memory cells.

* * * * *

UNITED STATES PATENT AND TRADEMARK OFFICE
CERTIFICATE OF CORRECTION

PATENT NO. : 7,490,190 B2
APPLICATION NO. : 11/544361
DATED : February 10, 2009
INVENTOR(S) : Skull It is certified that error appears in the above-identified patent and that said Letters Patent is hereby corrected as shown below:

In column 1, line 10, delete "Jun. 2, 2002," and insert -- Jun. 12, 2002, --, therefor.

In column 8, line 53, in Claim 5, delete "SIMID" and insert -- SIMD --, therefor.

In column 9, line 14, in Claim 8, delete "memos" and insert -- memory --, therefor.

Signed and Sealed this

Twenty-first Day of April, 2009

JOHN DOLL
*Acting Director of the United States Patent and Trademark Office*